United States Patent
Lahaye

[15] 3,686,948
[45] Aug. 29, 1972

[54] TURBINE-TYPE VOLUMETRIC FLOWMETERS

[72] Inventor: Raymond Lahaye, Clamart, France
[73] Assignee: Societe d'Instrumentation Schlumberger, Paris, France
[22] Filed: Nov. 25, 1970
[21] Appl. No.: 92,689

[30] Foreign Application Priority Data
Nov. 28, 1969 France..................6941076

[52] U.S. Cl....................................73/230
[51] Int. Cl.....................................G01f 1/12
[58] Field of Search............................73/230, 231

[56] References Cited

UNITED STATES PATENTS

| | | | |
|---|---|---|---|
| 3,142,179 | 7/1964 | Souriau | 73/231 |
| 3,364,741 | 1/1968 | Hicitox | 73/230 |
| 3,203,242 | 8/1965 | Souriau | 73/231 |
| 3,340,733 | 9/1967 | Lasher | 73/228 |

Primary Examiner—Richard C. Queisser
Assistant Examiner—Herbert Goldstein
Attorney—William R. Sherman, Stewart F. Moore and Jerry M. Presson

[57] ABSTRACT

This turbine-type flowmeter is intended to be used with means, known in themselves, for annuling any non-axial component of the absolute velocity of the fluid at its arrival at the measuring turbine. The flowmeter comprises a detector element for detecting the non-axial component of the absolute velocity of the fluid at its exit from the turbine, and a corrector element acting on the speed of rotation of the turbine, and actuated by the said detector by the intermediary of a servo-control device such as to annul the non-axial component of the absolute exit velocity of the fluid.

6 Claims, 5 Drawing Figures

TURBINE-TYPE VOLUMETRIC FLOWMETERS

The present invention relates to a turbine-type volumetric flowmeter.

Turbine-type volumetric flowmeters, if $Q$ is the volumetric fluid flow rate to be measured and $N$ the speed of rotation of the turbine, have a response curve $$N = F(Q)$$

substantially linear within well defined limits of the flow rate, viscosity and density of the fluid.

There is shown in FIG. 1, for a prior art flowmeter of this type, the relative deviations from linearity $\Delta Q/Q$ observed as a function of the flow rate $Q$ (from 100 to 1,300 $m^3 h$) for three particular petroleum products in common use, namely

|  | Density at 15°C | Kinematic viscosity $\gamma$ (in centistokes) |
|---|---|---|
| Automobile petrol or gasolene | 0.740 | 0.5 |
| Jet-fuel | 0.792 | 1.8 |
| Diesel oil | 0.828 | 5 |

The small deviations from linearity observed ($\pm 2.10^{-3}$) are only obtained exceptionally by this type of measuring instrument, in the dynamic ranges

| of flow rate | $Q\max/Q\min \leq 10$ |
| and of viscosity | $\gamma\max/\gamma\min \leq 10$ | and only at the price rice of a very well designed and manufactured construction of this measuring instrument.

FIG. 2, which shows a graph of the relative deviations from linearity $\Delta Q/Q$ observed as a function of the ratio $Q/\gamma$, brings out the fact that the curves corresponding to the three petroleum products mentioned above fit together imperfectly, especially at the extreme flow rates. The curved portions which fall outside the interval corresponding to the range of flow rates 120–1,200 $m^3/h$ have been drawn in broken lines.

The bad fit of these curves has the following principal causes:
localized changes in the flow conditions
influences of a non-hydraulic nature (friction).

Furthermore, the means curve of $\Delta Q/Q$ as a function of $Q/\gamma$ often presents large anomalies for small values of $Q/\gamma$.

In order to palliate these irregularities, flowmeter manufacturers have first of all tried to reduce the couples of mechanical friction. Among the various propositions made, the following can be cited:
smooth bearings (or roller bearings) having a low coefficient of friction,
the bearings themselves driven in rotation by a second turbine,
compensation for axial thrusts, servo-controlled or not.

These dispositions have improved the operation of flowmeters at low flow rates, but they represent only partial solutions to the problem posed. Whatever solution is adopted,
there always remains a couple of non-negligeable solid friction,
the couples $C_v$ of friction of the viscose type are not linear with respect to the angular velocity $\omega$ of rotation of the turbine, but rather have the form $C_v = a\omega + b\omega^2 + \ldots$ The result is that the resistant couple applied to the turbine is a non-linear function of its speed of rotation $\omega$. Consequently, the overall moment with respect to the axis of rotation of the received quantities of movement of the fluid is itself not a linear function the speed of rotation. Finally, the relative vector velocity is deviated between the inlet and the outlet of the turbine in a variable manner according to the fluid flow rate to be measured and the characteristics (viscosity, density) of the fluid.

Certain manufacturers have thus tried, and for a long time, to make flowmeters such that the inlet and outlet vector velocities of the fluid were equipollent.

These flowmeters comprise in general two co-axial turbines of opposite pitch, disposed one following the other, such that the energy of rotation of the fluid leaving the first turbine turns the second turbine, which is used for the measurement, and such that the absolute velocity of the fluid at the outlet from this second turbine is axial.

Such flowmeters are still troubled by the following defects:
the two turbines are not identical hydraulically,
the friction couples from one to the other are different,
their speeds of rotation are different.

The principal object of this invention is to provide a turbine-type volumetric flowmeter which is much less sensitive than those of the prior art to variations in the fluid flow rate as well as to the physical characteristics (viscocity, density) of the fluid.

To this end, according to the invention, the volumetric flowmeter is characterized in that it comprises, in addition to the means, known in themselves, for annulling any non-axial component of the absolute velocity of the fluid at its arrival at the measuring turbine, a detector element for detecting the non-axial component of the absolute velocity of the fluid at its exit from said turbine, and a corrector element acting on the speed of rotation of said turbine and actuated by said detector by the intermediary of a servo-control device so as to annul said non-axial component of the absolute exit velocity of the fluid.

Under these conditions, no energy is taken away from the kinetic energy of the fluid; the turbine has a speed which can really be called "speed of synchronization", for it is solely a function of the flow rate and of the distribution of velocities and practically independent on the one hand of mechanical friction and on the other hand of the physical characteristics (viscosity, density) of the fluid whose flow rate is being measured.

The element for detecting the non-axial component of the absolute exit velocity of the fluid can be constituted:
either by a second turbine mounted co-axially with, and downstream of, the preceding turbine, this second turbine being provided with blades of axial direction and being followed by a transducer member for translating that component into an error signal, or by a plane blade of axial direction and free to bend in flection, accompanied by strain gauges for delivering the error signal.

The corrector element for annuling the non-axial component of the absolute exit velocity of the fluid can be constituted by a motor/reducing-gear group
  which drives the measuring turbine in rotation,
  or which acts on the position of a flag-like flap mounted pivotably upstream of the measuring turbine.

The invention will be better understood from the following detailed description of several embodiments of a volumetric flowmeter according to the invention, given in relation to the accompanying drawings in which.

Figure 1:
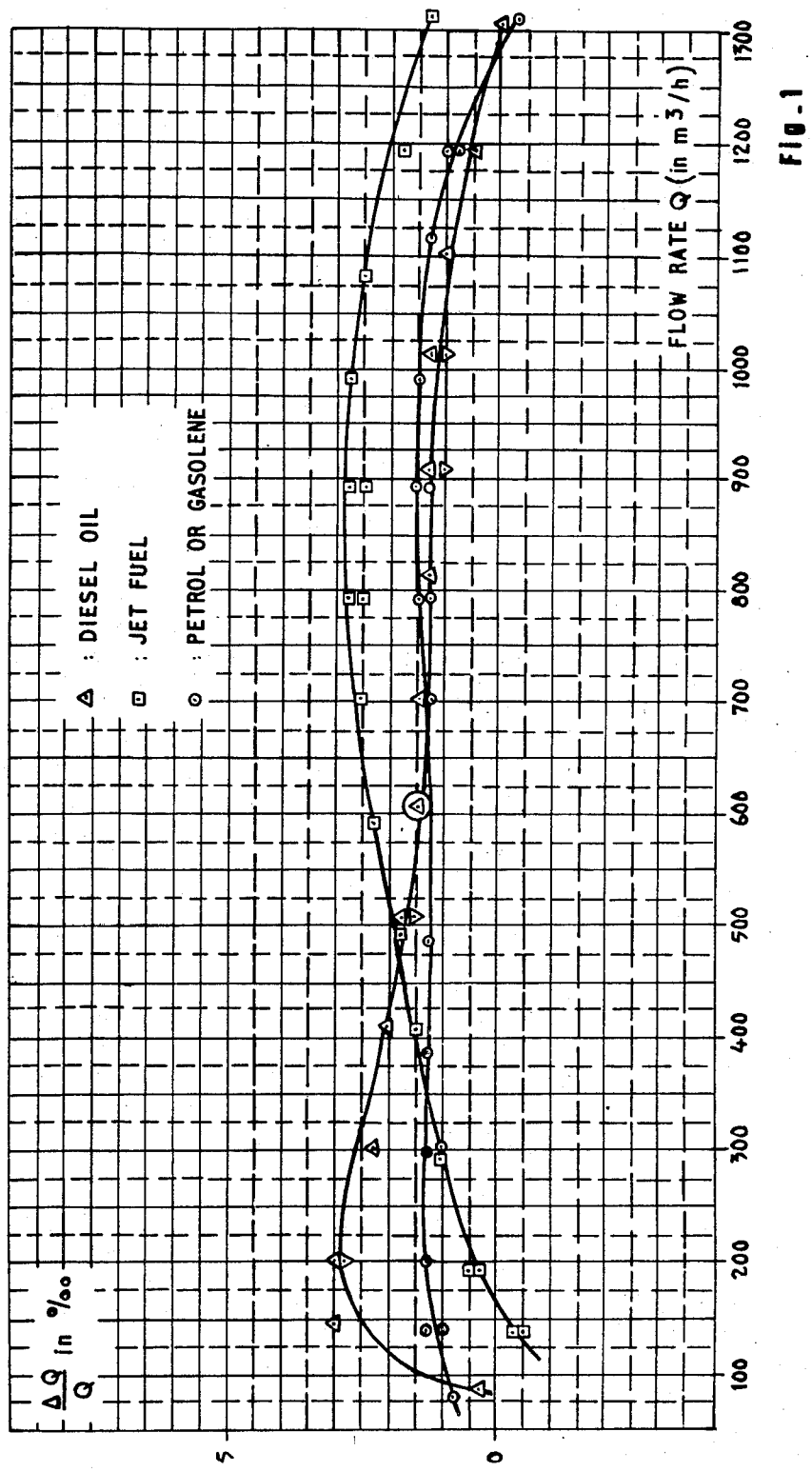
FIGS. 1 and 2 are graphs of the relative deviations from linearity $\Delta Q/Q$ observed as a function of the flow rate $Q$ and of the ratio $Q/\gamma$ respectively, these graphs having already served in the explanation of the prior art.
Figure 2:
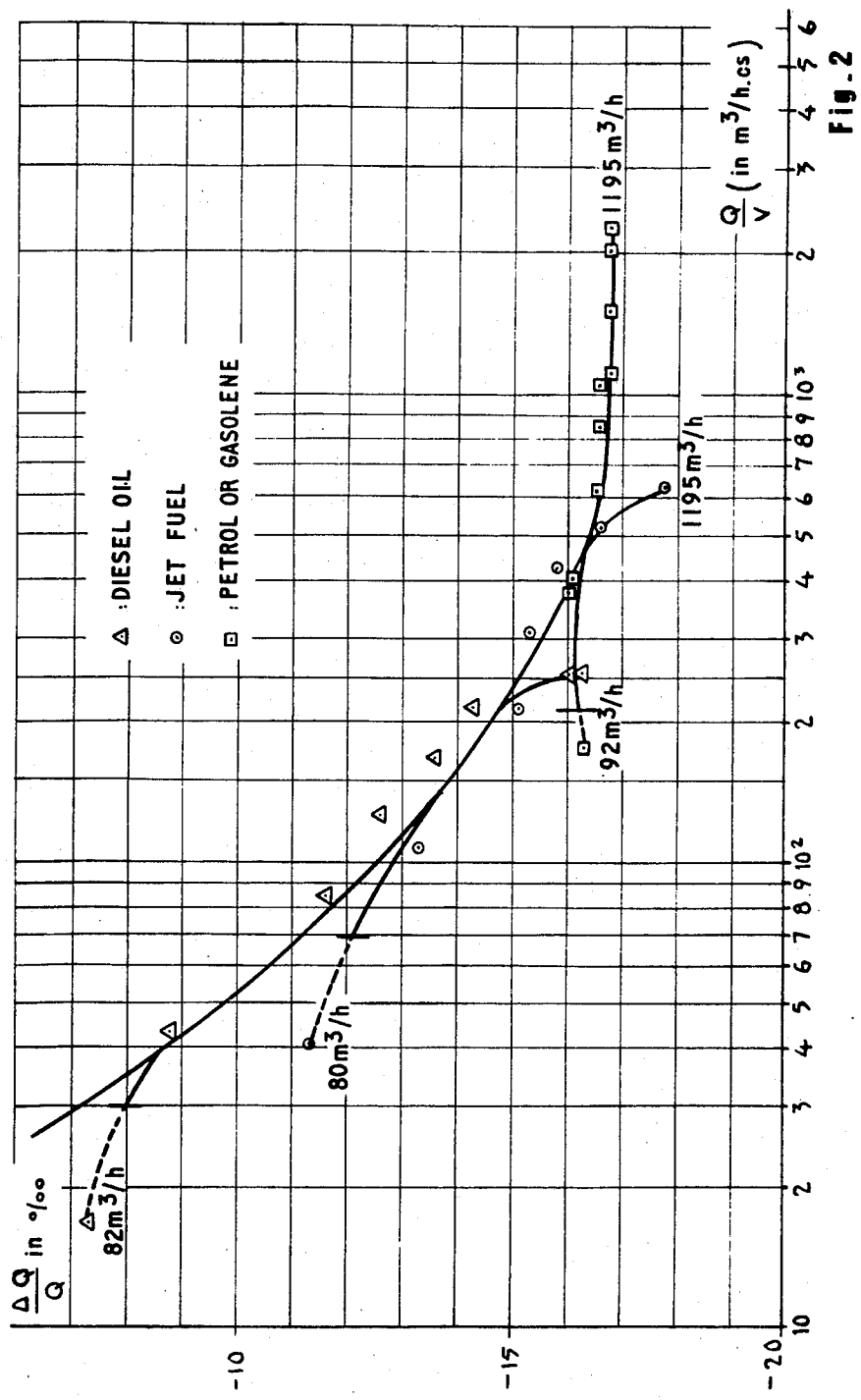

Reference will now be made to the accompanying drawings and first of all to FIG. 3.

A fluid is flowing in a conduit 1 in the direction indicated by the arrow. In order to reduce the pressure losses to a minimum and for technilogical reasons, the fluid is made to have at the inlet of the flowmeter a purely axial absolute velocity. The irregularities of distribution and the rotations possibly created upstream by disturbing elements whatever they be, are practically reduced to nothing at the inlet of the flowmeter by means of a tranquilizer 2 of which the parallel nest of tubes 2a can be seen, as well as a convergent portion described hereafter. In an envelope 11 of the flowmeter are disposed an inlet convergent portion 12, an outlet divergent portion 13 and an intermediate tubular portion 14, this latter portion defining the stream of fluid on which the volumetric flow rate measurement is made. The diameters of these elements are preferably chosen such that the hydraulic conditions are distinctly turbulent for the range of flow rates and the natures of the products to be envisaged. The elements 11, 12, 13, 14 form the body of the flowmeter.

To the elements 12, 13 and 14 are rigidly fixed bearings-holders 12a, 13a and 14a, each constituted by an assembly of plane radial blades. The bearings-holders 12a, 13a and 14a themselves rigidly carry smooth or roller bearings 12c, 13c$_1$, 13c$_2$ and 14c, by the intermediary of sections 12b, 13b and 14b of a co-axial shaft profiled into a point at the inlet and at the outlet, as is known. In the first two of these bearings is journalled the axle shaft of a measuring turbine 15 having helical blades, and in the last two is journaled the axle shaft of a detection turbine 21 having axial blades.

The measuring turbine 15 carries at its periphery a small inset bar 16 made of a material having high magnetic permeability. The bar 16 co-operates with a fixed assembly, inserted in a fluid-tight manner in the walls of the elements 11, 14, comprising in immediate proximity to the bar 16, a small permanent magnet 17 and a winding 18, disposed in a tubular element 19 flanged exteriorly. The frequency of the electric current induced in the winding 18 by the assembly 16, 17 enables speed of rotation of the turbine 15 to be determined.

The detection turbine 21, disposed downstream of the measuring turbine 15, is sensitive to any component of rotation of the absolute velocity of the fluid at the outlet of 15, the speed of rotation of the turbine being substantially proportional to the value of the component of rotation of the fluid. The rotations of the turbine 21 are translated by a transducer element 22, known in itself, into an "error signal". This signal is transmitted by a line 31, which passes through the walls of the elements 11, 14 via a fluid-tight seal 32, to a servo-control device 33. By way of an example, the transducer 22 is a photo-electric detector of rotation and the servo-control device 33 comprises a frequency-to-voltage converter and an amplifier.

The device 33 in turn sends a control signal through a line 34 to a motor/reducing-gear group 41, 42, disposed preferably at the exterior of the flowmeter. The group 41, 42 drives, by the intermediary of a shaft 43, passing through the walls of the elements 11, 14 via a fluid-tight seal 44, as well as of a right-angled gearing 45, the shaft of the measuring turbine 15, so as to annul the error signal by a servo-control of the rotation of the turbine.

In the example which has just been described, it can happen that the detection turbine 21 has the disadvantage of having a troublesome mechanical threshold, which results from friction to which its shaft is subjected. For this reason it is generally preferable to replace this turbine by a quasi-fixed detection member, whose variations of strain under the influence of the hydrodynamic action of rotation to be annuled are sensed. This structure has the advantage not only of being practically devoid of threshold, but also of simplifying the construction of the apparatus.

Figure 3:
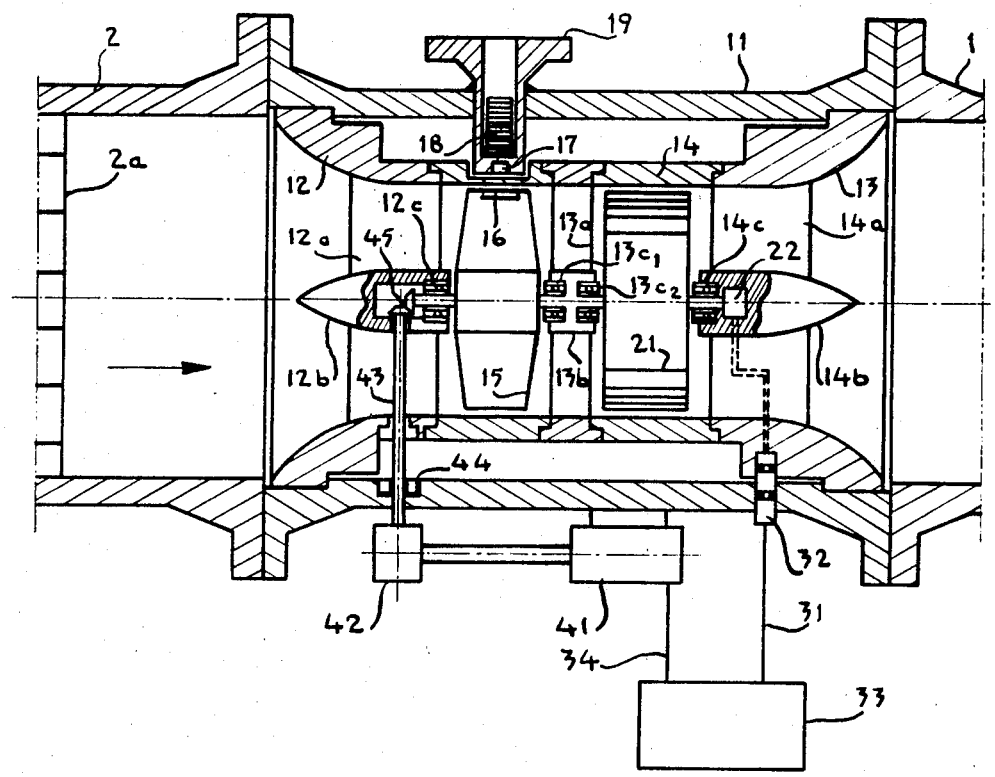
FIGS. 3, 4 and 5 are longitudinal sections of three embodiments of the flowmeter according to the invention.
Figure 4:
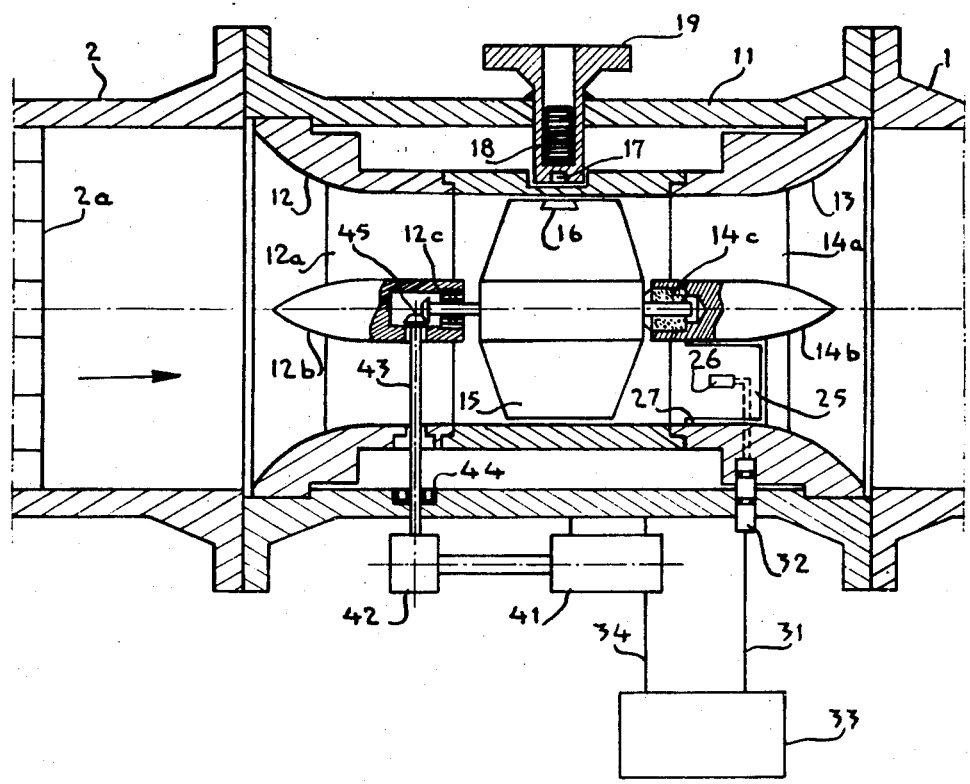
Figure 5:
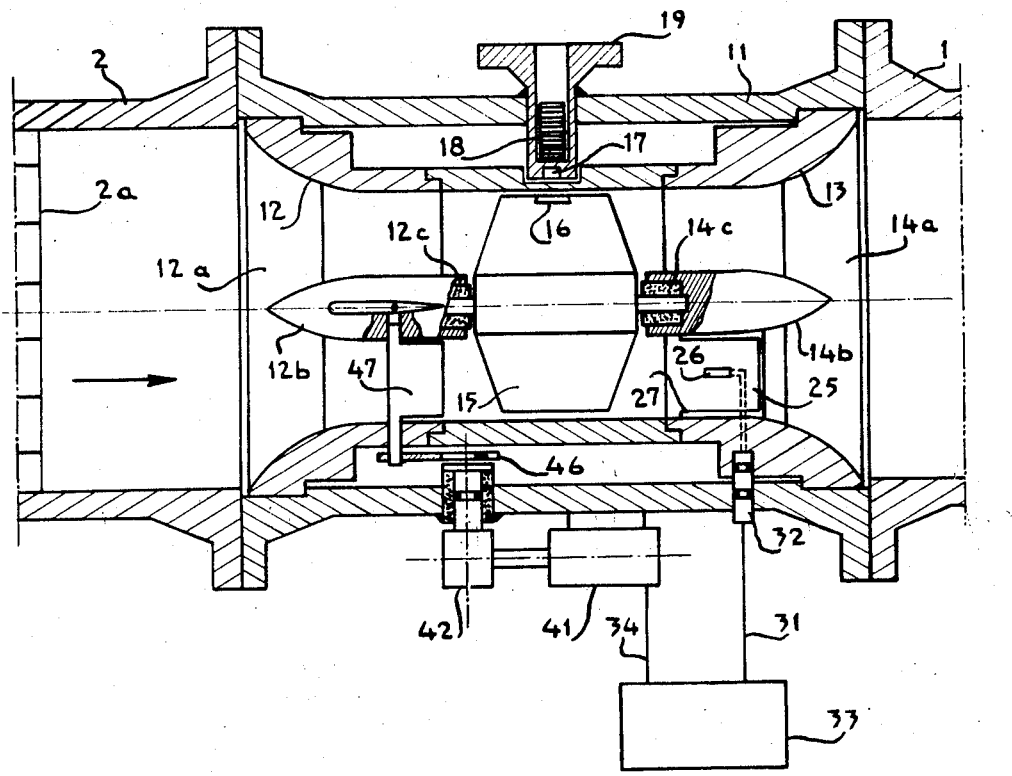

FIGS. 4 and 5 will now be described, in which elements homologous to those of FIG. 3 are given the same reference numerals. The two embodiments of FIGS. 4 and 5 have in common this point that the turbine 21 of the example of FIG. 3 is replaced, for reasons which have just been indicated, by a plate 25 which is free to bend in flection, and which is displosed radially downstream of the turbine 15, and whose deformation is sensed by strain gauges 26, known in themselves, or by any other suitable means. The plate 25, in the examples of FIGS. 4, 5, is fixed at the upstream edge of a recess 27 formed in one of the blades of the bearing-holder 14 a. Such a plate, under the action of the flowing fluid, vibrates at a relatively high frequency (several hundreds of Hertz) proportional to the speed of flow of the fluid. It is easy, by suitable filtering, to get rid of this parasitic signal and to preserve only the very low frequency variations, which are the only ones useful in the servo-control considered here.

In the embodiment of FIG. 4, as in the embodiment of FIG. 3, the servo-control acts on the rotation of the turbine and is obtained in exactly the same way.

By contrast, the embodiment of FIG. 5 is entirely different from this point of view. The control signal furnished by the servo-control device 33 is transmitted to a motor/reducing-gear group 41, 42, inserted in a fluid-tight manner in the wall of the element 11, so as to actuate, by the intermediary of an excentric 46, a flag-like flap 47 pivotably mounted upstream of the measuring turbine 15.

In this latter case, the energy necessary for making the turbine 15 turn at its speed of synchronization is no longer furnished by a motor, as in the embodiment of FIG. 4, but by the fluid to the detriment of its pressure. This solution has the advantage that energy of external origin is only consumed in an intermittent manner, which permits the servo-control device to be simplified.

It is appropriate to underline however that the embodiment of FIG. 4 is particularly well adapted to gases, whereas the embodiment of FIG. 5 is applicable only to incompressable fluids, that is to say liquids.

It will be noted that in the embodiment of FIG. 4, all of the energy consumed by the rotation of the turbine is furnished by the driving motor. Accordingly the flowmeter according to the invention does not take any energy away from the gas that passes through it.

The effectiveness of the flowmeters according to the invention is determined lower the sensitivity of the detector of the speed of rotation of the fluid.

In practice, due to the invention, it is possible to lower by nearly 10 times the threshold of operation of a turbine, while maintaining an acceptable precision of measurement.

I claim:
1. A volumetric fluid flowmeter comprising
a body through which flows the fluid, the flow rate of which is to be measured,
a measuring turbine mounted in the body so as to be rotated by the flowing fluid about an axis parallel to the direction of fluid flow;
means for detecting the speed of rotation of the measuring turbine;
means for annulling any non-axial component of the absolute velocity of the fluid present at the measuring turbine, said means comprising
a detector element for detecting any said non-axial component of the absolute velocity of the fluid at its exit from the measuring turbine;
a corrector element acting on the speed of rotation of the turbine;
a servo-control device connecting said detector element to said corrector element, said detector element comprising
a plane blade radially mounted in the body parallel to the axial flow of the fluid so as to be free to bend; and
strain gauge means for sensing said bending and for delivering an error signal to the servo-control device whereby such bending gives a measure of the non-axial component of the absolute exit velocity of the fluid.

2. A flowmeter according to claim 1 wherein the said corrector element comprises
A flap pivotally mounted upstream of the measuring turbine;
And a motor/reducing-gear group acting on the position of said flap.

3. A volumetric fluid flow meter comprising
a body through which flows the fluid the flow rate of which is to be measured;
a measuring turbine mounted in the body so as to be rotated by the flowing fluid about an axis parallel to the direction of fluid flow;
means for detecting the speed of rotation of the measuring turbine; and
means for annulling any non-axial component of the absolute velocity of the fluid present at the measuring turbine, said means comprising
a detector element for detecting any said non-axial component of the absolute velocity of the fluid at its exit form the measuring turbine;
a corrector element acting on the speed of rotation of the turbine; and
a servo-control device connecting the detector element to the corrector element and wherein said detector element comprising
a second turbine mounted in the body coaxially with, and downstream of, the measuring turbine, the second turbine being provided with blades of axial direction whereby its rotation is a measure of the non-axial component of the said absolute exit velocity of the fluid,
and a transducer member for translating the rotation of said second turbine into an error signal for the servo-control device wherein the transducer member is a photo-electric detector of rotation.

4. Flowmeter according to claim 3, wherein said corrector element comprises
a motor/reducing-gear group driving the measuring turbine in rotation.

5. Flowmeter according to claim 3, wherein said servo-control device comprises
a frequency-to-voltage converter and an amplifier.

6. Flowmeter according to claim 5, wherein said corrector element comprises
a motor/reducing-gear group driving the measuring turbine in rotation.

* * * * *